Oct. 4, 1949.                R. R. CANDOR                2,483,526
                           DOMESTIC APPLIANCE

Filed Sept. 26, 1945                              4 Sheets-Sheet 1

INVENTOR.
Robert R. Candor
BY
Attorneys

Oct. 4, 1949.   R. R. CANDOR   2,483,526
DOMESTIC APPLIANCE
Filed Sept. 26, 1945   4 Sheets-Sheet 2
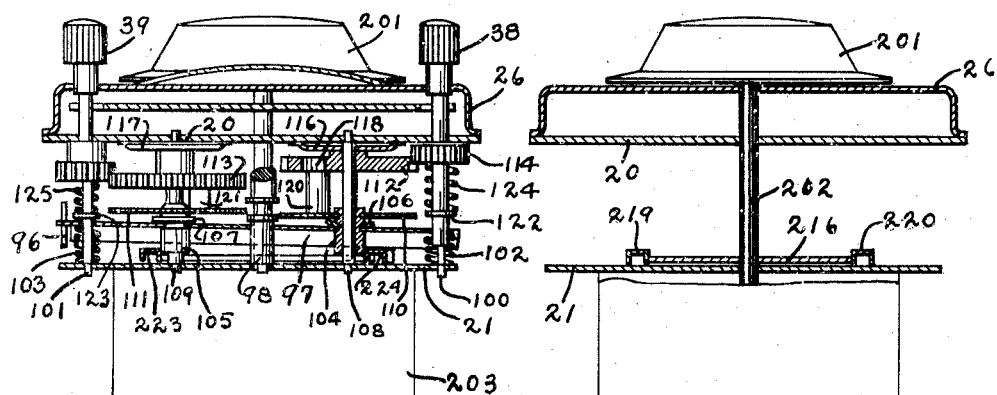
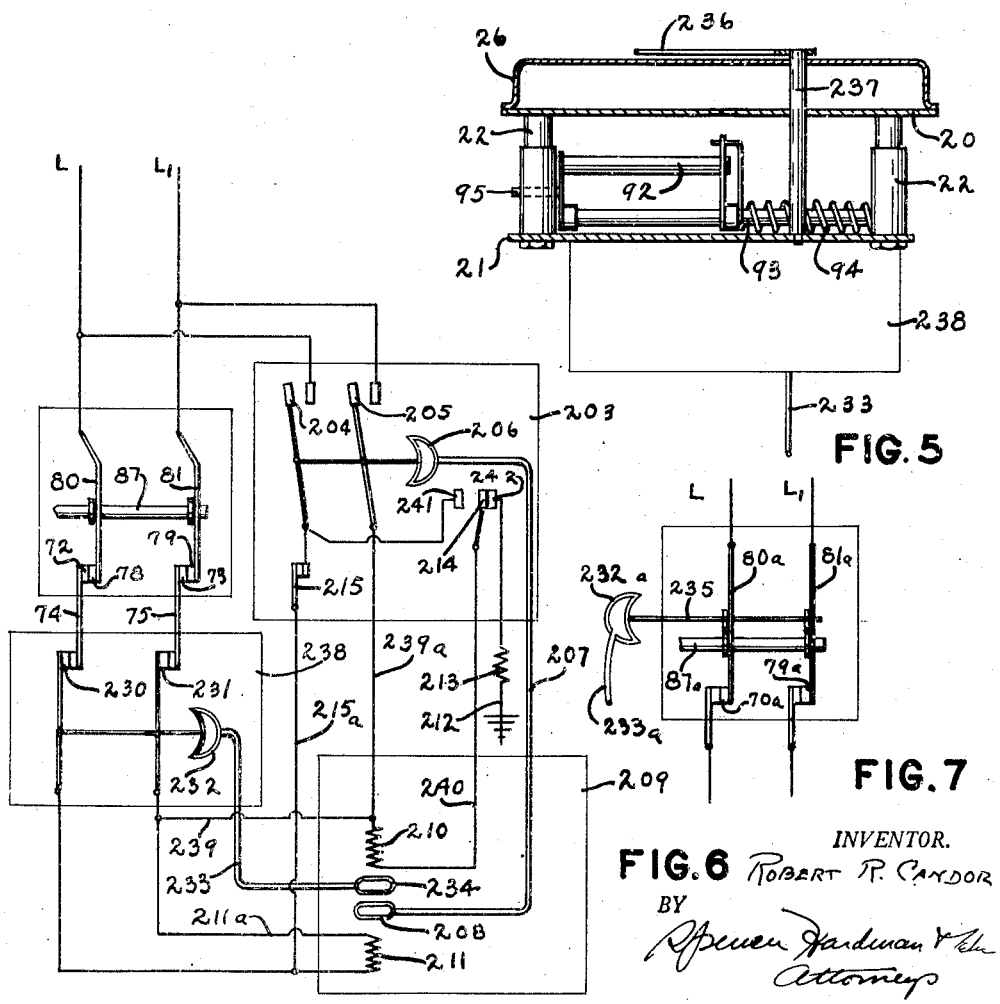
INVENTOR.
Robert R. Candor
BY
Spencer Hardman &
Attorneys Oct. 4, 1949.  R. R. CANDOR  2,483,526
DOMESTIC APPLIANCE
Filed Sept. 26, 1945  4 Sheets-Sheet 3

INVENTOR.
Robert R. Candor
BY
Spencer Hardman John
Attorney

INVENTOR.
ROBERT R. CANDOR

Patented Oct. 4, 1949

2,483,526

UNITED STATES PATENT OFFICE 2,483,526

DOMESTIC APPLIANCE

Robert R. Candor, Oakwood, Ohio, assignor to General Motors Corporation, Dayton, Ohio, a corporation of Delaware Application September 26, 1945, Serial No. 618,680

9 Claims. (Cl. 219—20)

This invention relates to domestic appliances, and more particularly to controls for electric ranges, or the like.

An object of this invention is to provide a combined time and thermostatic control for the oven of an electric range, or the like, in which there is little danger of incorrectly manipulating the controls.

Another object of this invention is to provide a combined time and thermostatic control for an oven of an electric range, or the like, which is provided with a timer, a timer thermostat, and a non-timer thermostat; the arrangement being such that, when the timer is manipulated to pre-determine a controlled heating period, the non-timer thermostat is locked in the off position, and, conversely, when the non-timer thermostat is manipulated to place it in a temperature position, then the timer is locked to prevent it from being placed in a predetermining position.

Another object of this invention is to provide a control which includes a timer, a timer thermostat, a non-timer thermostat; the arrangement being such that, when the timer and timer thermostat are placed in control, the non-timer thermostat is locked out of control, and vice versa.

Further objects and advantages of the present invention will be apparent from the following description, reference being had to the accompanying drawings, wherein a preferred form of the present invention is clearly shown.

In the drawings:

Fig. 3 is a cross-section taken along the lines 3—3 of Figs. 1 and 2;

Fig. 4 is a cross-section taken along the lines 4—4 of Figs. 1 and 2;

Fig. 5 is a cross-section taken along the lines 5—5 of Figs. 1 and 2;

Fig. 6 is a wiring diagram showing the control applied to the heaters of an electric oven;

Fig. 7 is a view of a portion of Fig. 6, showing a modified form;

Fig. 9 is a top view, partly in elevation, of the control shown in Fig. 8;

Figure 1:
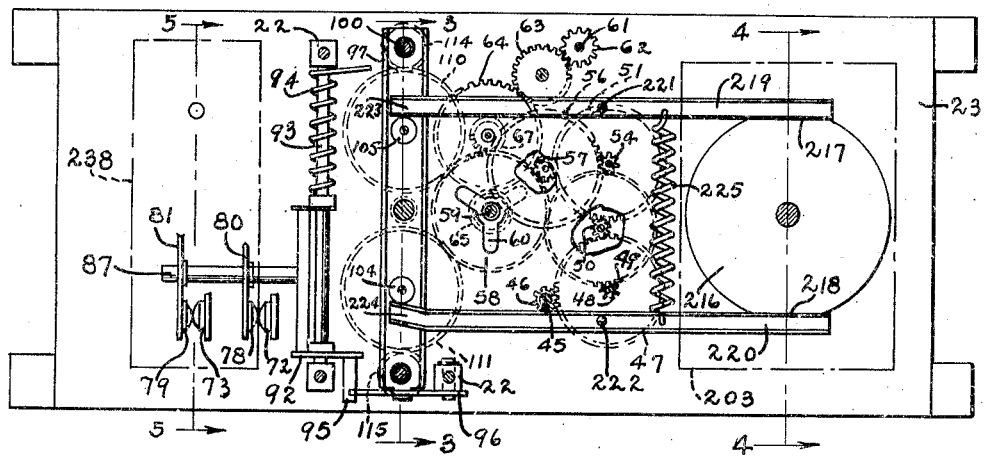
Fig. 1 is a view taken from the rear of the control instrument, the view being cross-sectional in parts.
Figure 2:
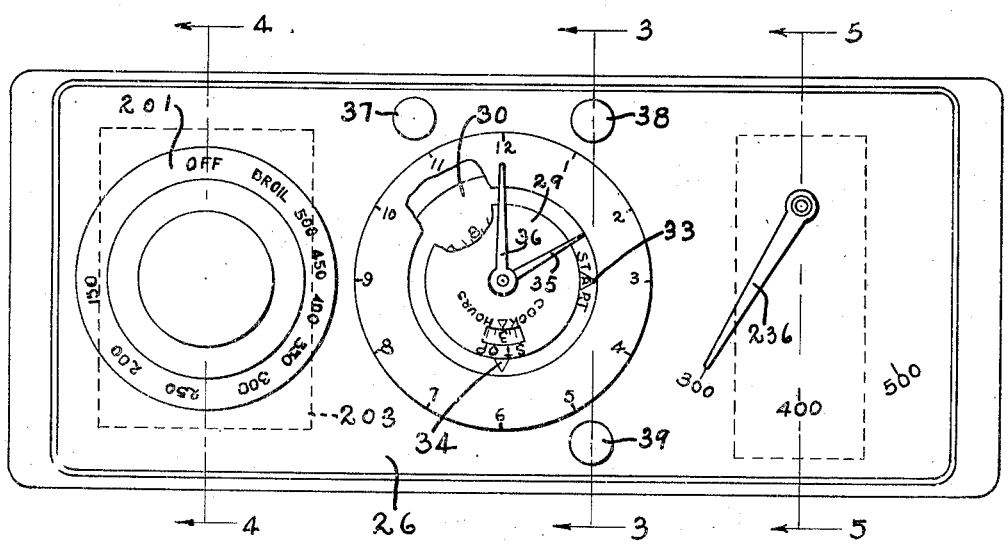
Fig. 2 is a front elevation.

Figs. 1 to 7 inclusive show the application of my invention to a timer of the character disclosed in the patent to A. R. Hutt, No. 2,310,527, granted February 9, 1943. Figs. 8 to 13 inclusive show the invention applied to a timer of the character disclosed in the patent to F. Lux, Re. 22,570, granted November 28, 1944. The illustration of the timers in these patents is by way of example, and not with the intention of limiting the invention to the application of these specific timers.

In Figs. 1 to 7 inclusive, the timer shown in Hutt Patent 2,310,527 is modified by omitting the alarm control 41, and the parts used to operate the alarm. Also the switch control knob 40 has been omitted, together with the parts which are peculiar to the operation of the knob 40. The remaining parts of the device disclosed in the Hutt patent are retained, and are numbered with the same numbers which are used in the patent. It is to be understood that such parts as are numbered in my application with the same numbers as in the Hutt Patent are intended to operate in the same manner, and have the same construction, being modified only to the extent necessary for the application of my invention. It is to be noted that all of the parts which correspond to those in the patent to Hutt are numbered below 200. The parts which are peculiar to my invention, are numbered between 200 and 300. Description of the parts numbered below 200 is therefore omitted, and only such description is given as may be necessary to explain how the invention is applied to them.

Briefly, the structure of the Hutt Patent includes a timer having time indicators 35, 36, a start indicator 33, a stop indicator 34, a start knob 38, a stop knob 39 and a time set knob 37. When it is desired to correct the setting of the time indicators, the knob 7 is actuated. When it is desired to set the start indicator 33, the start knob 38 is pushed in and rotated until the start indicator is at the desired starting time. When it is desired to set the stop indicator 34, the stop knob 39 is pushed in and rotated to set the start indicator 34 at the desired position. When the hour indicator 35 comes into coincidence with the start indicator 33 (at 3 o'clock for example) the time mechanism picks up the start indicator 33 and carries it with the hour hand 35. Also the contacts 78, 79 are closed at this time. When the hour hand or indicator 35 reaches the stop indicator 34 (at 6 o'clock for example) the time mechanism picks up the stop indicator 34 and carries it with the hour hand 35 until such time as a new heating period is predetermined by setting the stop indicator 34 away from the hour hand 35. Also the contacts 78, 79 are opened at 6 o'clock.

The mechanism of the Hutt patent is not described in detail, reference being made to the patent for detailed description thereof. However, some of the elements which cooperate with my invention will be briefly reviewed. When the start knob 38 is pushed in and rotated, the floating bar 97 is pushed down (Fig. 3) together with the hub 104. The pin 120 is moved away from the aperture 118. Likewise, when the stop knob 39 is pushed in and rotated, the floating bar 97 is lowered at the left end (Fig. 3), together with the hub 105. The pin 121 is moved away from its aperture 119 which is not illustrated in this application, but is shown in the patent. As the hour hand 35 comes into coincidence with the start and stop indicators 33 and 34, the pins 120 and 121 respectively come into coincidence with the apertures 118 and 119, and the bar 97 rises at the right and left ends of Fig. 3 at the corresponding times respectively. The operation is such that the contacts 78, 72, 73 and 79, which are controlled by the bar 97, are maintained open from 2 to 3 o'clock, are closed from 3 to 6 o'clock, and are again opened at 6, in the particular settings illustrated in this application. Both the hubs 104 and 105 are in their lower positions (Fig. 3) from 2 to 3 o'clock, the hub 104 rising at 3 o'clock, and the hub 105 rising at 6 o'clock.

A non-timer thermostat is interlocked with the hubs 104 and 105 in such a manner that the non-timer thermostat cannot be moved from its off position as long as the time control has its hubs 104 and 105 in their lower position. Conversely, when the non-timer thermostat is moved away from its off position, the hubs 104 and 105 are locked in their upper position, so that the timer cannot be set, by means of knobs 38 or 39, to predetermine a heating cycle.

The non-timer thermostat may be any well known construction. Merely by way of example, the non-timer thermostat may be of the construction disclosed in the application of Francis H. McCormick, S. N. 232,592, filed September 30, 1938, and issued July 16, 1948, as Patent No. 2,404,139. This non-timer thermostat may be provided with a setting knob 201 (corresponding to 38 of McCormick), which is rotatable, and rotates a shaft 202 (corresponding to 110 of McCormick). The shaft 202 actuates mechanism in box 203, which may include movable contacts 204 and 205 (corresponding to 82 and 80 of McCormick, respectively), which are opened and closed by the diaphragm 206, connected by tubing 207 with a bulb 208 (corresponding to 40 of McCormick) placed inside of the oven 209 intermediate the top heater 210 (24 of McCormick) and lower heater 211 (182 of McCormick). The knob 201 may have an off position, temperature positions such as from 150° to 500°, and a broil position. When the knob 201 is moved to the broil position, the heater 210 alone is energized; when the knob 201 is in a temperature position (from 150° to 500°) the lower heater 211 is energized at full wattage, and the upper heater 210 is energized at reduced wattage between the line L₁ and the neutral line 212, which is in series with the resistance 213, preferably placed outside of the oven 209. When the knob 201 is first turned to broil, and then back to some temperature position, such as 300°, then both heaters 210 and 211 are energized at full wattage to preheat the oven quickly and then, when the contacts 204 and 205 are first opened when the oven reaches 300°, then the switch 214 (McCormick 162) is changed in position, so that the upper heater is heated at reduced wattage together with the lower heater 211 at full wattage for the remainder of the heating period. A switch 215 (McCormick 136) is provided which is open only in the broil position of the knob 211, and thus prevents the energization of the lower heater 211 at this time. The non-timer thermostat per se forms no part of my invention.

The non-timer thermostat is provided with an interlocking mechanism, which is connected with the hubs 104 and 105 of the timer. For example, the shaft 202 may be provided with a disc 216, fixed and rotatable therewith. It is provided with two flat surfaces 217 and 218. These surfaces cooperate with the bars 219 and 220 respectively, which are fulcrumed at 221 and 222 respectively on the plate 21. The ends 223 and 224, respectively of bars 219 and 220, are adapted to move into and out of the spaces under (Fig. 3) the hubs 105 and 104 respectively. A spring 225 is provided, which tends to rock the bars 219 and 220 towards each other adjacent the disc 216. When the knob 201 is in the off position, the disc 216 is in the position shown in Fig. 1, with the flat portions 217 and 218 parallel to the bars 219 and 220. Under these conditions, the ends 223 and 224 are not under the hubs 104 and 105, and thus the timing mechanism may be set, by operation of the knobs 38 and 39 and downward movement of hubs 104 and 105 to predetermine a timed heating cycle. However, if the knob 201, of the non-timer thermostat, is moved away from its off position before the time mechanism is set, then the flat portions 217 and 218 are moved out of parallel with the bars 219 and 220, thus rocking these bars about the fulcrums 221 and 222, so that the ends 223 and 224 are moved under (Fig. 3) the hubs 105 and 104 respectively. This movement locks the hubs 104 and 105 of the timing mechanism in their upper positions so that the timer cannot be set to predetermine a heating cycle. Conversely, when the time mechanism is set to predetermine a heating cycle, the hub 105 (with or without the hub 104) is moved to its lower position, thus locking the bars 219 and 220 in the position shown in Fig. 1. This locks the non-timer thermostat in its off position, since the knob 201 cannot be rotated from its off position under these conditions.

A timer thermostat is provided, which is placed in control of the heaters 210 and 211 jointly with the timer when the timer is set for a predetermined heating cycle. This timer thermostat may be placed in electrical parallel circuit with the non-timer thermostat. The arrangement is such that either thermostat can close the circuit to the heaters. However, because of the interlocking arrangement heretofore described, it is not possible for both thermostats to energize or control the heaters at the same time.

The timer thermostat may be of any suitable construction, well known in the art. It may be adjustable to open and close its contacts between 300° and 500°, or it may be set permanently at some pre-selected temperature such as 300° or 350°, which is generally accepted "time" meal temperature. Conveniently, it may include contacts 230 and 231 which are opened and closed by a diaphragm 232 connected by tube 233 with the bulb 234, placed in the oven 209 conveniently adjacent the bulb 208. As the oven temperature rises and falls, the thermostatic liquids in bulbs 208 and 234 move the diaphragms 206 and 232 respectively to open and close their corresponding contacts at the selected temperatures, as is apparent.

The timer thermostat has its contacts 230 and 231 in series with the contacts 72 and 73 of the timer. They are connected to the heaters 210 and 211 as shown in Fig. 6.

In the modification shown in Fig. 7, the diaphragm 232a, which is connected by a tube 233a with the oven bulb, actuates the contacts 78a and 79a to open and close them in response to oven temperature. The contacts 78a and 79a may be the same as contacts 78 and 79 of Fig. 6, except that they are operated by the diaphragm in addition to the pin 87 of the timer. It is to be understood that the connecting means 235 has a lost motion connection with the spring members 80a and 81a, so that the contacts 78a and 79a can be opened by either the timer thermostat or by the timer bar 87.

In the operation of the modification shown in Figs. 1 to 6 inclusive, assume that the non-timer thermostat is in the off position, that it is 2 o'clock, and that the user desires to predetermine a heating cycle between 3 and 6 o'clock, with a temperature of 300° in the oven 209. The knobs 38 and 39 are actuated to place indicators 33 and 34 in the position shown in Fig. 2. The timer thermostat knob 236 is placed at 300°, which actuates shaft 237 and adjusts the setting of diaphragm 232 in thermostat box 238 in the wellknown manner. At 2 o'clock, the contacts 78 and 79 are kept open by the pin 87, as described in the Hutt patent. At 3 o'clock, the hub 104 rises, moves bar 97, thus actuating pin 87 and closing contacts 78 and 79. Since the oven 209 is presumed to be cold, the contacts 230 and 231 are also closed by operation of bulb 234 and diaphragm 232. Under these conditions, current can flow from the lines L and L1 through contacts 78, 79, 230, 231 to the heater 211 at full wattage. In addition, current can flow through heater 210 at reduced wattage, passing from line L1 through contacts 79 and 231 and line 239 to heater 210 and from thence through line 240, switch 214, contact 242, resistance 213 to the neutral 212. Baking conditions are therefore established at 2 o'clock. (The construction of the non-timer thermostat, as described in the McCormick application, is such that switch 214 is in the position shown in Fig. 6 when the knob 201 is in the off position.) The heaters 210 and 211 are now under the control of diaphragm 232. The contacts 230 and 231 are now closed and opened in response to oven temperatures from 3 o'clock to 6 o'clock. At 6 o'clock the hub 105 rises, and this actuates pin 87 to open the contacts 78 and 79. Therefore at this time the heaters 210 and 211 remain deenergized until the user elects to reset the mechanism. If the user should elect to use the non-timer thermostat at any time that a predetermined cycle has not been set, the knob 201 is moved from the off position to the desired position. This movement may include rotation to the broil position and then to 300°, so that a preheat cycle, followed by a bake cycle is produced. In accordance with the disclosure in the McCormick application, this actuation of the knob 201 causes the contacts 204 and 205 to close, places the contact 214 in contact with 241 and allows 215 to remain closed. Under these conditions current can flow from power source L, L1 through contacts to the heaters 210 and 211 in parallel thus energizing them at full wattage during the preheating cycle. The circuit for heater 211 is from L, contacts 204, 215, 215a, heater 211, 211a, 239, 239a, contact 205 and L1. The circuit for heater 210 is from L contact 204, 241, 214, 240, heater 210, 239a, 205 and L1. When the oven reaches 300°, the diaphragm 206 opens the contacts 204 and 205, and this action simultaneously moves the contact 214 from 241 to 242 as described in the McCormick application. Thereafter, when the contacts 204 and 205 are again closed, as the oven cools, the current flows from the lines L, L1 to the heater 211, as previously described and also from the line L1, contact 205, 239a, through heater 210, line 240, contacts 214 and 242, resistance 213 to neutral 212, so that thereafter the heaters 210 and 211 are cycled with full wattage in 211 and reduced wattage in 210, as more fully described in the McCormick application. During all this time that the non-timer thermostat has been in control of the heaters 210 and 211, the contacts 78 and 79 have been kept open by bar 87, because the time indicator 35 has been in coincidence with both the indicators 33 and 34.

In the modification shown in Fig. 7, the circuits are the same as in Fig. 6 except that the contacts 230 and 231 of Fig. 6 are omitted, since contacts 78a and 79a serve the double function of contacts 230, 231, 78 and 79.

In the modification shown in Figs. 8 through 12, the invention is applied to the structure disclosed in the patent to F. Lux Re. 22,570. The parts in this application which correspond to the parts of the Lux patent are numbered with the same number as in the Lux patent with the suffix 3 added. For example, the case 10 of the Lux reissue patent is indicated by 310 in this application. The clock hands 12 and 13 of the Lux patent are indicated at 312 and 313 in this application, etc. It is to be noted that all of the parts in this application corresponding to parts in the Lux patent are numbered between 300 and 400. The parts which have been added, modified or changed in this application over the Lux patent are numbered above 400.

The following structures of the Lux reissue patent are modified: The off and set manipulating button 84 of the Lux patent operates the same in this application, except that the pointer 401 in this application points downwardly in the off position instead of upwardly as in the patent. The shaft 70 of the Lux patent is provided with a cam 402 of different shape from the cam 89 of the patent. It is also provided with a second cam 403 which is additional to that shown in the patent. The contacts 387 and 388, which are actuated by the cam 402 are connected to a non-timer thermostat 404, which may be substantially the same as the non-timer thermostat disclosed in the McCormick application described with respect to Figs. 1 to 6, which may be provided with a rotatable knob 405 (corresponding to McCormick knob 38) movable to temperature settings from an off position and also movable to a broil position. The additional cam 403 is adapted to open and close contacts 406 and 407 (which are inwardly sprung similarly to 387 and 388) upon stationary contacts 408 and 409 respectively. The stationary contacts 408 and 409 are connected electrically with the lines L₁ and L respectively and also with the stationary contacts 385 and 386 respectively. The electrical connection between 408 and 385 is indicated by 410 and the connection between 409 and 386 by 411. These connections may actually be made by connector screws 410a and 411a, shown in Fig. 9. The cams 402 and 403 are shaped as illustrated so that they close their respective contacts at only one of four positions during the intermittent rotation of the control knob 384.

The non-timer thermostat knob 405 is provided with interlocking means with the off and set knob 384 so that one or the other of the knobs has to be at the off position when the remaining knob is moved away from the off position. To this end, the knob 405 may be provided with a circular recess 412 and the knob 384 may have a circular recess 413. When the knob 405 is moved away from the off position, as shown in Fig. 8, the knob 401 cannot be moved from the off position because the edges of the recess 413 strike against the edge of the knob 405.

A timer thermostat 415 may be provided and may have an adjusting handle 416 substantially the same as timer thermostat in the modification of Figs. 1 to 6. This thermostat may be provided with a diaphragm 417 which opens and closes contacts 418 and 419 through the medium of bulb 420 in response to temperatures within the oven 421. The thermostat 404 has contacts 422 and 423 opened and closed by the diaphragm 424 through the medium of bulb 425 in response to temperatures within the oven 421. An upper heater 426 and a lower heater 427 are placed in the oven. The contacts 406 and 407 are connected with the stationary contacts 428 and 429 of the thermostat 415. The contacts 387 and 388 are connected with the stationary contacts 430 and 431 of the non-timer thermostat 404.

As in the Lux patent, the knob 384 can be moved 135 degrees clockwise from the off position when it is desired to set the timer in control of the oven. When the hour hand 313 reaches the on time (4 o'clock for example), the knob 384 snaps 45 degrees from its on position, snaps another 45 degrees when the hour hand reaches 6 o'clock, and remains there indefinitely until the user elects to move it to the off position or back to the on position.

Figure 8:
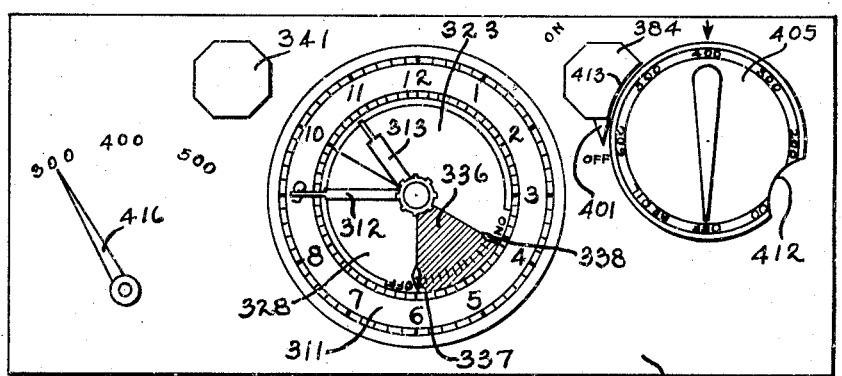
Fig. 8 is a front view of another modified form of the control.
Figures 10, 11:
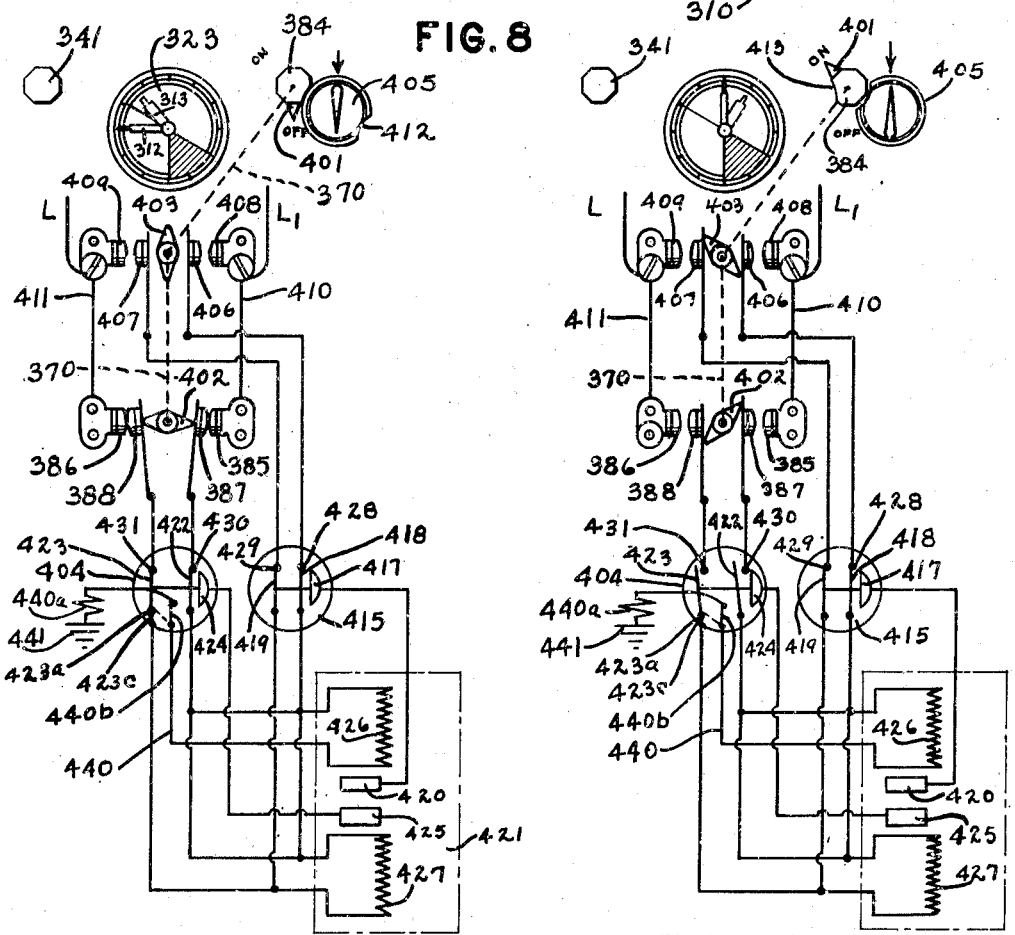
Fig. 10 is a wiring diagram of the control shown in Figs. 8 and 9, as applied to an oven heating system, the non-timer thermostat being in control of the heaters.
Fig. 11 is a view similar to Fig. 10, but showing the timer and timer thermostat in control, before the predetermined heating period has started.

In the operation of the modification shown in Figs. 8 through 13, assume that the user desires to bake under non-timed conditions at 400°. She moves the knob 384 to the off position (if not already there) as shown in Fig. 8, with the pointer 401 down. She also moves the non-timer thermostat knob 405 to 400 as shown in Figs. 8 and 10. Under these conditions, the cam 402 closes the contacts 387 and 388 and cam 403 opens the contacts 406 and 407. Under these conditions current can flow from the lines L, L₁ to the lower heater 427 to energize it at full wattage. Also current can flow through the upper heater 426 at reduced wattage flowing from L₁ to the upper heater 426 and from thence through line 440 through resistance 440a to the neutral 441. This energizes the lower heater at reduced wattage to produce baking conditions which are maintained at 400° by opening and closing the contacts 422 and 423 in response to oven temperatures.

Figure 12:
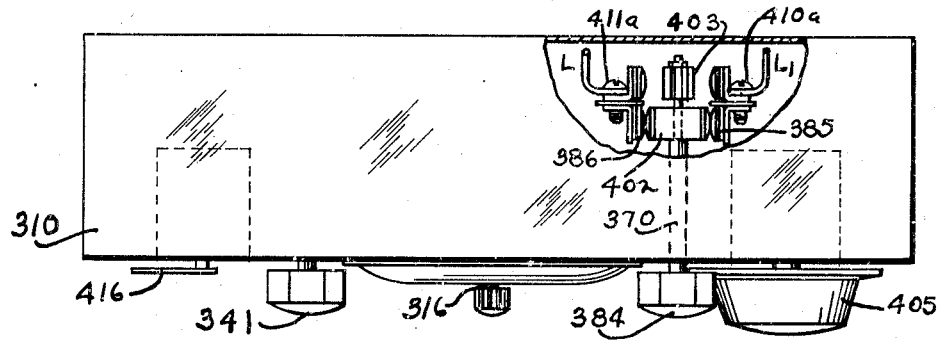
Fig. 12 is a view similar to Fig. 11, showing the position of the parts when the predetermined period starts.
Figure 13:
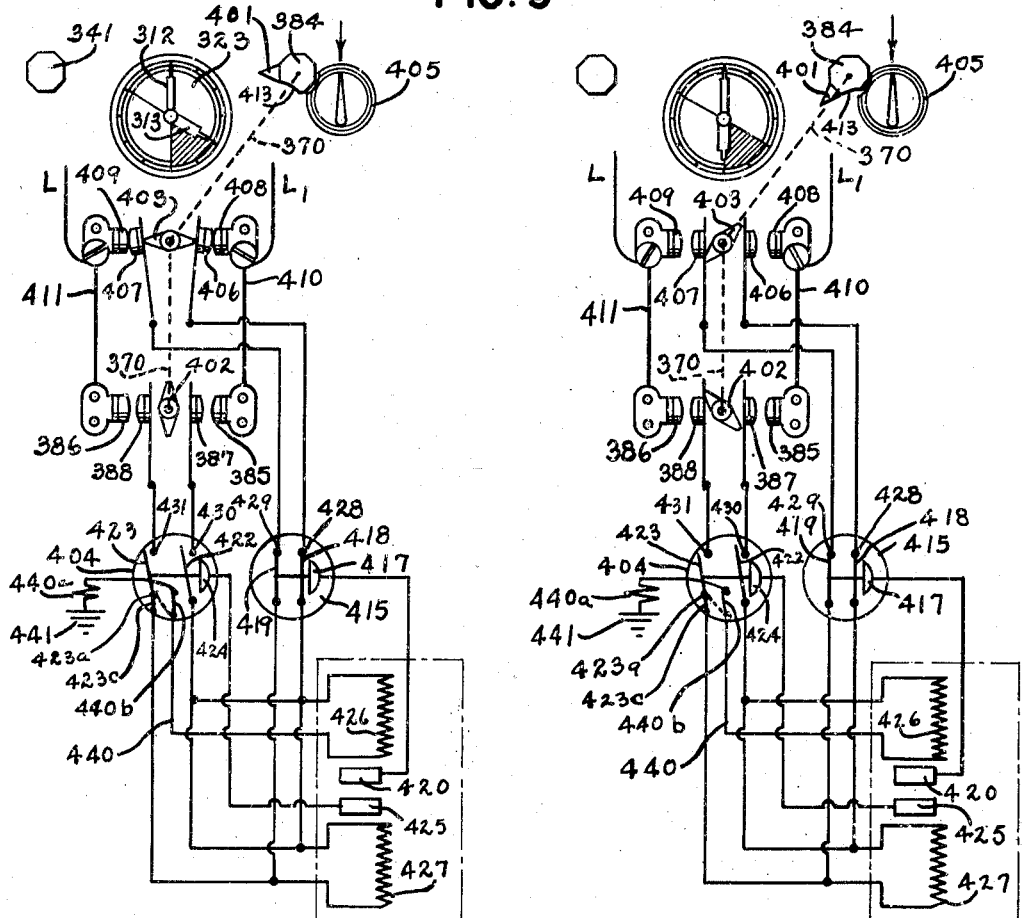
Fig. 13 is a view similar to Figs. 11 and 12, showing the parts in the positions when the predetermined period terminates.

Assume now that, at 11 o'clock the user wishes to have a predetermined heating cycle from 4 to 6 o'clock, with a temperature of 300°. She sets the handle 416 at 300°, places the on indicator at 4 o'clock, the off indicator at 6 o'clock, and moves the knob 384 to the "on" position 135 degrees clockwise from the "off" position (before she can do this, the knob 405 must be in the off position). The conditions just described are shown in Fig. 11. Under these conditions the cams 402 and 403 open all circuits to the lines L, L₁ by opening the contacts 387, 388, 406 and 407. Nothing can be energized until 4 o'clock. When the hour hand 313 reaches 4 o'clock, conditions are established as shown in Fig. 12. The knob 384 has snapped 45 degrees counterclockwise. The cam 403 closes the contacts 406 and 407, whereas the cam 402 still allows the contacts 387 and 388 to remain open. Current can now flow from the lines L, L₁ to the lower heater 427 at full wattage through the thermostat 415. In addition, current can flow at reduced wattage through heater 426 from the line L₁ to the upper heater 426 and from thence through 440 and 441 to the neutral 441. Under these conditions the lower heater is energized at full wattage and the upper heater at reduced wattage. Both heaters are cycled through the medium of bulb 420 and diaphragm 417 to maintain the oven at 300° from 4 o'clock to 6 o'clock. At 6 o'clock, the knob 384 snaps another 45 degrees counterclockwise to the position shown in Fig. 13. Under these conditions the cams 402 and 403 cause or allow the contacts 387, 388, 406 and 407 to be open, thus disconnecting all of the heaters from the lines L and L₁. The system remains in this condition until such time as the user elects either to reset a predetermined heating cycle, in which case she would move the knob 384 to the on position, or, if she elected to establish a non-timed heating cycle, she would move the knob 384 to the off position and the knob 405 to the selected position.

It is to be understood that the thermostat 404 may be any well known thermostat or may be of the character disclosed in the aforementioned McCormick application. If of the McCormick type, the knob 405 can be manipulated for bake, broil, and preheat conditions as more fully disclosed in that application. In the broil position, contact 440b (corresponding to 162 of McCormick) will move from the position illustrated to contact 423a, while switch 423c (corresponding to 136 of McCormick) will move away from 423a.

While the form of embodiment of the invention as herein disclosed, constitutes a preferred form, it is to be understood that other forms might be adopted, as may come within the scope of the claims which follow.

What is claimed is as follows:

1. A control for electric ranges, or the like, comprising a timer adapted to establish a predetermined heating cycle and having predetermining and non-predetermining positions, a timer thermostat, said timer and timer thermostat adapted jointly to connect and disconnect heating means to a power source with said timer thermostat acting in response to temperatures created by said heating means during said predetermined heating cycle, a non-timer thermostat having off and heating temperature positions, adapted to connect and disconnect said heating means in response to temperatures created by said heating means, and means responsive to the setting of said non-timer thermostat in temperature position for locking said timer in said non-predetermining position while said timer is in non-predetermining position.

2. A control for electric ranges, or the like, comprising a timer adapted to establish a predetermined heating cycle and having predetermining and non-predetermining positions, a timer thermostat, said timer and timer thermostat adapted jointly to connect and disconnect heating means to a power source with said timer thermostat acting in response to temperatures created by said heating means during said predetermined heating cycle, a non-timer thermostat having off and heating temperature positions adapted to connect and disconnect said heating means in response to temperatures created by said heating means, and means responsive to the setting of said timer in predetermining position while said non-timer thermostat is in off position for locking said non-timer thermostat in said off position.

3. A control for electric ranges, or the like, comprising a timer adapted to establish a predetermined heating cycle, said timer having a time indicator, a start indicator and a stop indicator, said stop indicator being movable from coincidence with said time indicator to establish said cycle and locking with said time indicator as it comes into coincidence with said stop indicator, to start and stop said cycle, a timer thermostat, switch means controlled jointly by said timer and timer thermostat to connect and disconnect a power source and heating means during said heating cycle with said timer thermostat acting in response to temperatures created by said heating means, a non-timer thermostat having off and temperature positions to connect and disconnect said heating means and power source in response to temperatures created by said heating means, and means responsive to the setting of said non-timer thermostat in temperature position while said switch means is in disconnected position for locking said switch means in said disconnected position.

4. A control for electric ranges, or the like, comprising a timer adapted to establish a predetermined heating cycle, said timer having a time indicator, a start indicator and a stop indicator, said stop indicator being movable from coincidence with said time indicator to establish said cycle and locking with said time indicator as it comes into coincidence with said stop indicator, to start and stop said cycle, a timer thermostat, switch means controlled jointly by said timer and timer thermostat to connect and disconnect a power source and heating means during said heating cycle with said timer thermostat acting in response to temperatures created by said heating means, a non-timer thermostat having off and temperature positions to connect and disconnect said heating means and power source in response to temperatures created by said heating means, and means responsive to the setting of said stop indicator in heating cycle predetermining position while said non-timer thermostat is in off position to lock said non-timer thermostat in said off position.

5. A control for electric ranges, or the like, comprising a timer adapted to establish a predetermined heating cycle, said timer having a time indicator, a start indicator, a stop indicator and an off and set indicator, said stop indicator and off and set indicator being movable to establish a predetermined heating cycle, a timer thermostat, switch means controlled jointly by said timer and timer thermostat to connect and disconnect a power source and heating means during said heating cycle with said timer thermostat acting in response to temperatures created by said heating means, a non-timer thermostat having off and temperature positions to connect and disconnect said heating means and power source in response to temperatures created by said heating means, and means responsive to the setting of said non-timer thermostat in a temperature position while said off and set indicator is in off position for locking said off and set indicator in said off position.

6. A control for electric ranges, or the like, comprising a timer adapted to establish a predetermined heating cycle, said timer having a time indicator, a start indicator, a stop indicator and an off and set indicator, said stop indicator and off and set indicator being movable to establish a predetermined heating cycle, a timer thermostat, switch means controlled jointly by said timer and timer thermostat to connect and disconnect a power source and heating means during said heating cycle with said timer thermostat acting in response to temperatures created by said heating means, a non-timer thermostat having off and temperature positions to connect and disconnect said heating means and power source in response to temperatures created by said heating means, and means responsive to the setting of said off and set indicator in set position while said non-timer is in off position to lock said non-timer thermostat in said off position.

7. A control for electric ranges, or the like, comprising a timer having timer setting means movable to heating cycle predetermining and non-predetermining positions, a timer thermostat, switch means connecting and disconnecting a power source to and from a heating means, said timer and timer thermostat jointly opening and closing said switch means during a predetermined heating cycle with said timer thermostat acting in response to temperatures created by said heating means when said setting means is in cycle predetermining position and maintaining said switch means in open circuit position when said setting means is in non-predetermining position, a non-timer thermostat having off and temperature positions adapted to connect and disconnect said power source and heating means in response to temperatures created by said heating means, and means responsive to the setting of said non-timer thermostat in temperature position while said switch means is in open circuit position for locking said switch means in open circuit position.

8. A control for electric ranges, or the like, comprising a timer having timer setting means movable to heating cycle predetermining and non-predetermining positions, a timer thermostat, switch means connecting and disconnecting a power source to and from a heating means, said timer and timer thermostat jointly opening and closing said switch means during a predetermined heating cycle with said timer thermostat acting in response to temperatures created by said heating means when said setting means is in cycle predetermining position and maintaining said switch means in open circuit position when said setting means is in non-predetermining position, a non-timer thermostat having off and temperature positions adapted to connect and disconnect said power source and heating means in response to temperatures created by said heating means, and means responsive to the setting of said non-timer thermostat in temperature position while said timer setting means is in non-predetermining position for locking said timer setting means in said non-predetermining position.

9. A control for electric ranges, or the like, comprising a timer having timer setting means movable to heating cycle predetermining and non-predetermining positions, a timer thermostat, switch means connecting and disconnecting a power source to and from a heating means, said timer and timer thermostat jointly opening and closing said switch means during a predetermined heating cycle with said timer thermostat acting in response to temperatures created by said heating means when said setting means is in cycle predetermining position and maintaining said switch means in open circuit position when said setting means is in non-predetermining position, a non-timer thermostat having off and temperature positions and non-timer switch means actuated by said non-timer thermostat adapted to connect and disconnect said power source and heating means in response to temperatures created by said heating means, and means responsive to the setting of said timer setting means in heating cycle predetermining position while said non-timer thermostat is in off position for locking said non-timer thermostat in said off position.

ROBERT R. CANDOR.

REFERENCES CITED

The following references are of record in the file of this patent:

UNITED STATES PATENTS

| Number | Name | Date |
| --- | --- | --- |
| Re. 22,570 | Lux | Nov. 28, 1944 |
| 1,188,734 | Clement | June 27, 1916 |
| 1,745,420 | Hewitt | Feb. 4, 1930 |
| 2,065,844 | Wattles, 3d | Dec. 29, 1936 |
| 2,088,728 | Stranszky | Aug. 3, 1937 |
| 2,101,430 | Goldbert et al. | Dec. 7, 1937 |
| 2,266,149 | Biebel | Dec. 16, 1941 |
| 2,266,257 | Osterheld | Dec. 16, 1941 |
| 2,310,527 | Hutt | Feb. 9, 1943 |
| 2,331,535 | Candor | Oct. 12, 1943 |
| 2,392,166 | Lockwood | Jan. 1, 1946 |
| 2,402,787 | Stickel | June 25, 1946 |
| 2,416,084 | Candor | Feb. 18, 1947 |

FOREIGN PATENTS

| Number | Country | Date |
| --- | --- | --- |
| 493,379 | Great Britain | Oct. 7, 1938 |